United States Patent [19] [11] 3,904,000
Berger [45] Sept. 9, 1975

[54] SEGMENTED BRAKE DISK

[75] Inventor: Robert E. Berger, North Canton, Ohio

[73] Assignee: Goodyear Aerospace Corporation, Akron, Ohio

[22] Filed: Jan. 16, 1974

[21] Appl. No.: 433,818

[52] U.S. Cl. ...... 188/218 XL; 188/73.2; 192/107 R
[51] Int. Cl. ............................................ F16d 65/12
[58] Field of Search ................... 188/73.2, 218 XL; 192/107 R

[56] References Cited
UNITED STATES PATENTS

| | | |
|---|---|---|
| 2,153,280 | 4/1939 | Shelor ......................... 188/218 XL |
| 3,105,575 | 10/1963 | Dewar et al. ................. 188/218 XL |
| 3,397,760 | 8/1968 | Robins et al. ................ 188/218 XL |
| 3,412,831 | 11/1968 | Marcheron ................... 188/218 XL |
| 3,422,936 | 1/1969 | Marcheron ................... 188/218 XL |
| 3,605,968 | 9/1971 | Ely .............................. 188/218 XL |
| 3,698,519 | 10/1972 | Crossman.................... 198/107 R X |

Primary Examiner—George E. A. Halvosa
Attorney, Agent, or Firm—F. W. Brunner; P. E. Milliken; E. W. Oldham

[57] ABSTRACT

A brake disk has a plurality of arcual segments. At least a portion of the segments have projecting members and at least a portion of the segments have receiving members. The projecting members engage the receiving members to form an annular disk.

8 Claims, 4 Drawing Figures

PATENTED SEP 9 1975                                3,904,000
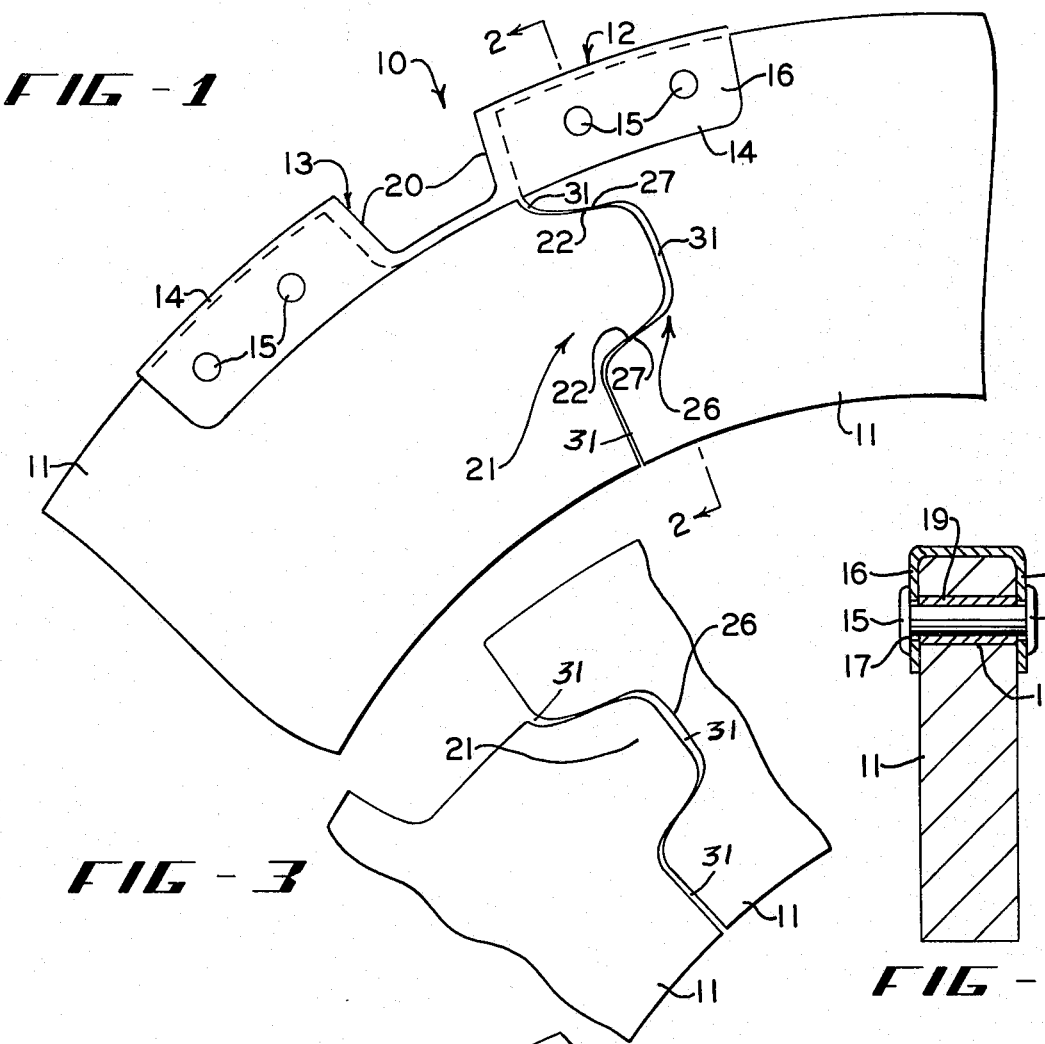
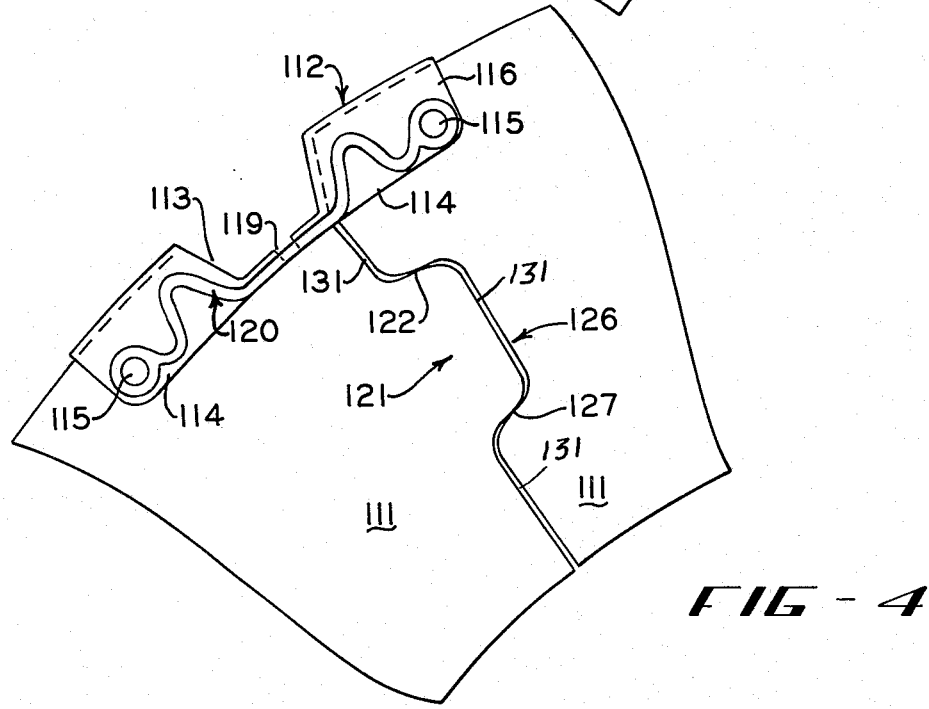

SEGMENTED BRAKE DISK

BACKGROUND OF THE INVENTION

The present invention relates to a segmented brake disk. More specifically, the present invention relates to a segmented brake disk in which the various segments engage one another to form an annular disk which is less susceptible to shear force and tensile failure.

Heretofore in the field of brake disk applications such as in jet aircraft, both commercial and military, the disks have generally been made as one continuous unit. Not only does such construction tend to be expensive, but such brake disks are subjected to high thermal stresses as well as shear and bending stresses and may actually fail during operation. Moreover, during various braking operations, a part or sector of the disk is subjected to additional stresses which may also cause failure.

The shortcomings of a solid continuous brake disk can be abated by utilizing segmented brake disks of the present invention wherein the segments are joined by springs or metal members. For example, loads and stresses due to great heat and high temperatures can be reduced by the provision of a gap which exists between the various segments and permits expansion. Additionally, according to the concepts of the present invention, shear and bending stresses are reduced and the application of braking forces are equalized.

In a particular embodiment of a prior art segmented brake disk, the disks are joined by a plug. However, this plug tends to readily transfer stress forces and thus does not tend to eliminate the above problems. Moreover, it is subject to failure brought about by shear and tensile forces transmitted through the plug.

SUMMARY OF THE INVENTION

It is, therefore, an object of the present invention to provide a segmented brake disk which is economical to fabricate.

It is another object of the present invention to produce a segmented brake disk wherein thermal stresses and loads are abated.

It is a further object of the present invention to provide a segmented brake disk wherein tensile components are reduced.

It is a still further object of the present invention to provide a segmented brake disk wherein the braking forces of the various segments tend to be equalized.

It is yet another object of the present invention to provide a segmented brake disk which has extended brake life.

These and other objects of the present invention are described in detail without attempting to discuss all of the various modifications in which the invention may be embodied; the invention being measured by the appended claims and not by the details of the specification.

In general, a segmented brake disk has a plurality of arcual ssegments with at least a portion of these segments having projecting members and at least a portion of the segments having receiving members. The projecting members engage the receiving members to form an annular brake disk.

DESCRIPTION OF THE DRAWINGS

FIG. 1 is a plan view showing the end portions of two adjacent segmented brake disks.

FIG. 2 is a cross sectional view taken on line 2—2 of FIG. 1 showing the attachment of a clip to the segment.

FIG. 3 is an enlarged plan view of FIG. 1 showing the engagement of a projection and a recess.

FIG. 4 is a plan view of another embodiment of the present invention.

DESCRIPTION OF THE PREFERRED EMBODIMENTS

A segmented brake disk according to the concepts of the present invention is generally indicated by the numeral 10. As shown in FIG. 1, the segmented brake disk is made up of a plurality of arcual brake portions or segments 11 which when joined together form an annulus type configuration. Although the various segments may be of different lengths, because of ease of manufacture, convenience of assembly and cost, they generally are of equal length.

In the embodiment disclosed by FIG. 1, segments 11 are securely joined together by clips, generally indicated by the numeral 12. Preferably, clips 12 are located at the outer periphery of the brake segments. Generally, the clips are provided with a central slot 13 and end portions 14 as shown in FIG. 1. Slots 13 usually engaged by keyways, not shown, cause brake disks 10 to rotate during a braking operation.

Brake disk 10 is commonly a rotating disk located in a brake assembly between a pressure plate and a back plate and is alternately arranged between stationary brake disks which have notches in their inner peripheries for keyed engagement with splines on a torque tube which prevents their rotation but allows axial flotation. The keyways of the rotating tube are carried by a wheel such as in the landing gear assembly of an aircraft. Although the stationary disks are generally made of a continuous carbon disk, they may also be made of segments in accordance with the concepts of the present invention.

In order to provide secure joinder of the segments 11, rivets 15 or other conventional fastening members join the segments to form disk 10. As seen in FIG. 2, side portions 16 of the clips have apertures 17 to allow for the insertion of the rivets. Additionally, segments 11 are provided with apertues 18 which are slightly larger and aligned with clip apertures 17 to allow quick and secure assembly of a clip to form an annular brake disk. Preferably, bushings 19 may be inserted in apertures 18 to provide a larger load transfer area. Clips 12 are made out of a strong metal such as steel which can withstand the forces exerted by the keyways during a braking operation. It has been found that force from the keyways to clips 12 are efficiently transferred to a fairly large area of clips when walls 20 over the clip slot are sloped approximately from about 20° to about 30° with respect to the vertical or with respect to a radial line.

Brake disk segments 11 have means for engaging each other. If a unidirectional disk is utilized, that is, a disk wherein forces will only be transferred onto one side of clips 12, then the engagement means may simply be a radially offset portion on each segment, not shown, which matingly engage each other such that a small gap exists between the offsets to allow for thermal expansion and bending. The arcual or horizontal surface of the offsets engage each other and transmit shear forces and loadings. Generally, in a preferred embodiment, FIGS. 1 and 3, the means for engagement may be a tongue generally indicated by the numeral 21 and a groove generally indicated by the numeral 26. Although the tongue may be of numerous shapes, preferably it has arcual or horizontal extending surfaces 22 and a radial length sufficient to resist high shear loading. Similarly, although the recess may have numerous shapes such as a groove, it preferably has arcual or longitudinal surfaces 27 which matingly engage arcual surfaces 22. As shown in FIGS. 1 and 3, it is highly desirable that the tongue and groove so engage each other along their arcual surfaces 22 and 27 such that a small gap 31 exists between the various segments along their radial surfaces for reasons set forth hereinbelow. Although the tongue is shown as being located on one end of a segment with the recess located at the other end of the segment, such locations can be varied. For example, a brake disk may be comprised of alternating segments one having tongues at each end with the adjacent segment having recesses at each end.

As clearly shown in FIGS. 1, 3 and 4, the preferred arcual surfaces 22 of tongue 21 have a slight inward taper, that is, they are not parallel but approach each other as they proceed toward the end of the tongue. Additionally, preferred arcual surfaces 27 of groove 26 have a slight outward taper, that is, they are not parallel, but diverge or separate from each other as they proceed toward the end of the groove or segment. Moreover, these surfaces of the tongue and groove, as readily apparent from the drawings, engage each other only along a limited portion of their tapered arcual surfaces. In other words, engagement is not along the full extent of the tapered arcual surfaces, but only along a minor fractional portion thereof.

During the braking operation, the clips which are secured tightly to the segments transmit drive and hoop loads. Additionally, heat buildup is encountered due to the friction between the rotating disk and the stationary disk during braking. During normal braking operations it is not unusual to have the surfaces of the disks exist at temperatures in excess of 2,500°F or 3,000°F. Such extreme temperatures, of course, cause expansion and introduce additional stresses into the brake disk. Due to the provision of gap 31 which preferably may be about one-sixteenth of an inch, the segments are free to expand into one another along arcual surfaces 22 of the tongue and arcual surfaces 27 of the recess. Thus provision of gap 31 largely eliminates or abates additional stresses due to heat buildup and thermal expansion. Moreover, tensile or hoop components resulting from a force transmitted along a diagonal line in an embodiment wherein a solid plug is utilized between two adjacent segments are also largely abated. Since such forces are greatly reduced, brake disk 10 has a longer or extended wear life since it may be used to a thinner thickness.

During the braking operation, the keyway, not shown, will exert a force such as on the left side of central slot 13 shown in FIG. 1. This tends to cause the righthand portion of the segment which in FIG. 1 contains a tongue to move radially outward and is generally balanced by an equal and opposing opposite force causing the adjacent lefthand portion of a segment containing a recess to move radially inward. Such forces are encountered in any rotating or stationary disk and create shear forces which are transmitted through the rivets to the segments or disks. These shear forces are transmitted throughout the disks or segments in a generally radial direction through the contact of arcual surfaces 22 and 27 of the tongues and recesses. Thus, the longitudinal extent of such surface generally must only be sufficient to adequately handle the typical and abnormal shear forces encountered due to the transfer of force by the keyway to the brake disk. Moreover, the provision of cap 31 permits the radially inner portion of the disks to bend out of a vertical plane during high stress operations as during a landing and thus abate stress buildup. The embodiment shown in FIGS. 1 – 3 thus represents a distinct advancement in the art.

A further advancement in the art is represented by the embodiment disclosed in FIG. 4 which is generally similar to the above embodiment except for the springs. Thus, the description with respect to FIGS. 1–3 is generally applicable to the embodiment shown in FIG. 4. In FIG. 4, segments 111 have clips generally indicated by the numeral 112. As in the above embodiment, clips 112 are generally made of a strong metal such as steel to withstand the high force exerted on them by keyways, not shown, of a wheel in a brake assembly. Clips 112 are generally provided with a central slot 113 and end portions 114. Moreover, rivets 115 or other conventional and fastening members attach the clips through sides 116 to the outer peripheries of segments 111 in any conventional manner such as with the use of bushings. The clips are generally applied only to rotating disks which are segments although they may also be applied to the inner peripheries of a segmented stationary disk. Generally, the stationary disks are not segmented due to the fact that problems of brake disk failure have largely occurred in the rotating disks.

Unlike the prior embodiment, clips 112 on the end of each segment are not connected to each other. In order to maintain the various segments in the form of an annular brake disk, a spring generally indicated by the numeral 120 connects one portion of a clip to the other portion. As shown in FIG. 4, this can be through the rivets. Thus, the precision required of the steel clips need not be as great and hence the cost of producing this embodiment is lowered. The basic purpose of connecting spring 120 is simply for ease of handling in that a complete annular brake disk may be carried and transported instead of various disconnected segments.

The configuration of the means for engaging the various segments of the embodiment disclosed in FIG. 4 is very similar to the embodiment as shown in FIGS. 1 – 3. Thus, a projection generally indicated by the numeral 121 engages a recess generally indicated by the numeral 126. In this embodiment, a projection has the shape of a tongue whereas the recess has the shape of a groove. Tongue portion 121 generally has longitudinal or arcual surfaces 122 and recess 126 has arcual or longitudinal surfaces 127 which matingly engage projection surfaces 122. Additionally, a cap 131 exists between the radial surfaces of the segments and desirably is on the order of approximately one-sixteenth of an inch. The projection may be located on one end of a segment with the recess being located on the other end or the brake disk may be made up of alternating segments containing projections on both ends and recesses on the ends of an adjacent segment. Of course, other shapes of projections and recesses may exist so long as generally a gap exists between the radial surfaces and arcual surfaces which engage one another are provided.

As in the above embodiment, due to the existence of gap 131, the additional shear stresses which are usually generated during the braking operation due to heat are largely abated since the segments can expand into one another. In fact, due to spring 120, the segments can readily quite freely expand into one another and thus virtually all stresses due to expansion are eliminated. Moreover, the provision of arcual surfaces 122 and 127 provide a fair amount of surface area through which any radial shear forces can be transferred to adjacent segments due to the effect of the driving force exerted by the keyways. Additionally, this embodiment largely produces an even distribution of clip drive loads because each segment is independent and resisted only by its corresponding wheel key. Also, since the segments can readily move with respect to one another as during a hard landing and since the segments may deform or bend out of a vertical plane as during a braking operation, the forces on the various segments tend to be equalized. Thus, since the stresses tend to be equalized or lower, a weaker segment material may be used or the brake segments may be worn to a thinner thickness. Another feature is that because the drive load produces only compression stresses in the disk material adjacent to the rivet holes, a stronger or more capable design results.

As apparent to one skilled in the art, various modifications can be made according to the concepts of the present invention without departing from the spirit of the invention herein disclosed. While in accordance with the Patent Statutes only two embodiments have been illustrated and described in detail, it is to be understood that the invention is not limited thereto, the scope of the invention being measured solely by the scope of the attached claims.

What is claimed is:

1. A segmented brake disk, comprising
a plurality of segments, at least a portion of said segments having a tongue,
at least a portion of said segments having a recess,
said tongue having tapered arcual surfaces and a radial surface,
said recess having tapered arcual surfaces and a radial surface,
said tongue tapered arcual surfaces and said recess tapered arcual surfaces matingly engaging each other, said segments contacting each other only through said tapered arcual surfaces, said contact of said tapered arcual surfaces being along a minor fractional portion thereof; and
said tongue and recess arcual surfaces so engaging each other to form a radial expansion gap between said radial surfaces of said tongue and said recess under all braking conditions.

2. A segmented brake disk according to claim 1, wherein said tongue is located at one end of said segment and said recess is located on the other end of said segment.

3. A segmented brake disk according to claim 1, wherein said segments are joined by clips.

4. A segmented brake disk according to claim 1, wherein said segments are joined by a spring.

5. A segmented brake disk according to claim 4, wherein each segment is joined to an adjacent segment having a clip.

6. A segmented brake disk according to claim 1 wherein said segments are of equal length.

7. A segmented brake disk according to claim 1 wherein said radial expansion gap exists between said segments in addition to said radial gap between said radial surfaces of said tongue and said recess.

8. A segmented brake disk according to claim 1, wherein said tapered arcual tongue surfaces are tapered inwardly and said tapered arcual recess surfaces are tapered outwardly.

* * * * *